OPTICAL TIME DIVISION MULTIPLEX COMMUNICATION SYSTEM

Filed June 15, 1967 2 Sheets-Sheet 1

INVENTORS
JOHN A. ARMSTRONG
WILLIAM V. SMITH
BY George Baron
ATTORNEY

United States Patent Office 3,521,068
Patented July 21, 1970

3,521,068
OPTICAL TIME DIVISION MULTIPLEX COMMUNICATION SYSTEM

John A. Armstrong, South Salem, and William V. Smith, Chappaqua, N.Y., assignors to International Business Machines Corporation, Armonk, N.Y., a corporation of New York Filed June 15, 1967, Ser. No. 646,367
Int. Cl. H04b *9/00;* H04j *3/00*
U.S. Cl. 250—199 5 Claims

ABSTRACT OF THE DISCLOSURE

This invention comprises a multiplex communication system with particular emphasis on a scheme employing mode locked lasers. A mode locked laser emits in a broad beam a train of ultrashort pulses, each pulse being very short compared to their separation in time, such train being sent through a beam divider so that N trains of short, equally spaced pulses are produced. In the path of each of the N trains is a modulator, a mirror, and a beam splitter, each modulator being controlled by an independent data channel. The optical paths traversed by the N trains, before they are all recombined in a single train, are each of a different and characteristic length. Thus, when combined, the N trains of short pulses are nonoverlapping in space. A detection scheme, particularly suited to the detection of short laser pulses, provides a means for sorting out the pulses and assigning them to their proper data channel at the receiver. By this means, a data transmission rate of $10^{11}$ bits/sec. is achieved.

BACKGROUND OF THE INVENTION

The subject invention pertains to an optical communications system capable of transmitting information at a very high rate, the order of $10^{11}$ bits per second. The system comprises two main parts, namely, a multiplexer and a detector. The former comprises a technique for multiplexing many channels of information onto a single train of identical pulses and the latter includes a system for sorting out the separate information channels, with particular emphasis on a detecting scheme suitable for separating information being carried in such single train of pulses.

While frequency multiplexing schemes for carrying many channels of information on a single carrier frequency are known, the present scheme utilizes the extreme localization of the carrier pulses in space, and their short duration in time makes possible a new type of multiplexing. A laser beam has a relatively high frequency, of the order of $10^{15}$ c.p.s., and thus a very wide bandwidth, allowing for the communication of many simultaneous messages. To transmit information over the maximum available bandwidth using a laser carrier, however, would require modulation rates not attainable with state-of-the-art modulation devices. The present invention provides for circumventing the bandwidth limitations of conventional light modulators.

In the invention described hereinafter, a mode locked laser emits a train of ultrashort pulses, such train being made to pass through an apertured plate having N openings, resulting in N identical trains of short, equally spaced pulses, each pulse having a width that is of the order of $\frac{1}{200}$ the spacing between pulses. In the path of each of the N pulse trains is a light modulator, a mirror, and a beam splitter. Each light modulator or shutter is controlled by an independent binary data channel. The optical paths traversed by the N trains, before they are all combined into a single train, are each of a different and characteristic length, so that pulses are nonoverlapping in time and occur in a definite sequence. A single beam of interleaved pulses is then transmitted to a receiver, where such beam is expanded and then divided by an apertured plate to present N identical pulse trains to a detector.

In the detection scheme used with the multiplexer, a local oscillator provides N trains of clock pulses separated in time. The clock pulses have the same widths as all the pulses from the transmitter. A separate one of these N trains of clock pulses is combined with each of the N received multiplexed trains. A plane polished single crystal of GaAs is oriented to sense the overlapping of a clock light pulse with an information-bearing light pulse. Both light pulses are polarized and the GaAs crystal emits a sum-frequency light pulse parallel to the plane of incidence of the light pulses impinging on the GaAs crystal. A detector located in the path of such emitted light senses such overlapping.

The foregoing and other objects, features and advantages of the invention will be apparent from the following more particular description of the preferred embodiment of the invention, as illustrated in the accompanying drawings.

DESCRIPTION OF THE PREFERRED EMBODIMENT

Before describing the multiplex communication system, a brief description of a mode locked laser will be given in that the characteristics of a mode locked laster are exploited in achieving the multiplex communication to be set forth hereinafter. If one modulates the internal loss of a laser at a frequency equal to the separation between adjacent oscillating longitudinal modes, the latter lock together with fixed relative amplitudes governed by the saturation of the active medium of the laser and with definite relative phases determined by the modulator. The laser, when mode locked, emits a train of pulses having the following characteristics:

(1) The pulse repetition frequency is equal to $c/2l$, where $l$ is the optical length of the laser cavity and $c$ is the speed of light.

(2) For $n$ locked oscillating modes of equal amplitudes, the width of an individual pulse in the time domain at half-intensity is $1/n\Delta\nu$ where $\Delta\nu$ is the axial mode separation of the laser.

(3) The peak pulse power is $n$ times the average laser power in the absence of locking.

A more detailed discussion of mode locked lasers and their characteristics is given in the article "Generation of Ultrashort Optical Pulses by Mode Locking the YAIG:Nd Laser" by M. DiDomenico et al. that appeared in the Apr. 1, 1966 issue of the "Applied Physics Letters," vol. 8, No. 7, pages 180–183. Sufficient description of the operation of a mode locked laser is given herein mainly as an aid in better understanding the invention.

Figures 1, 2:
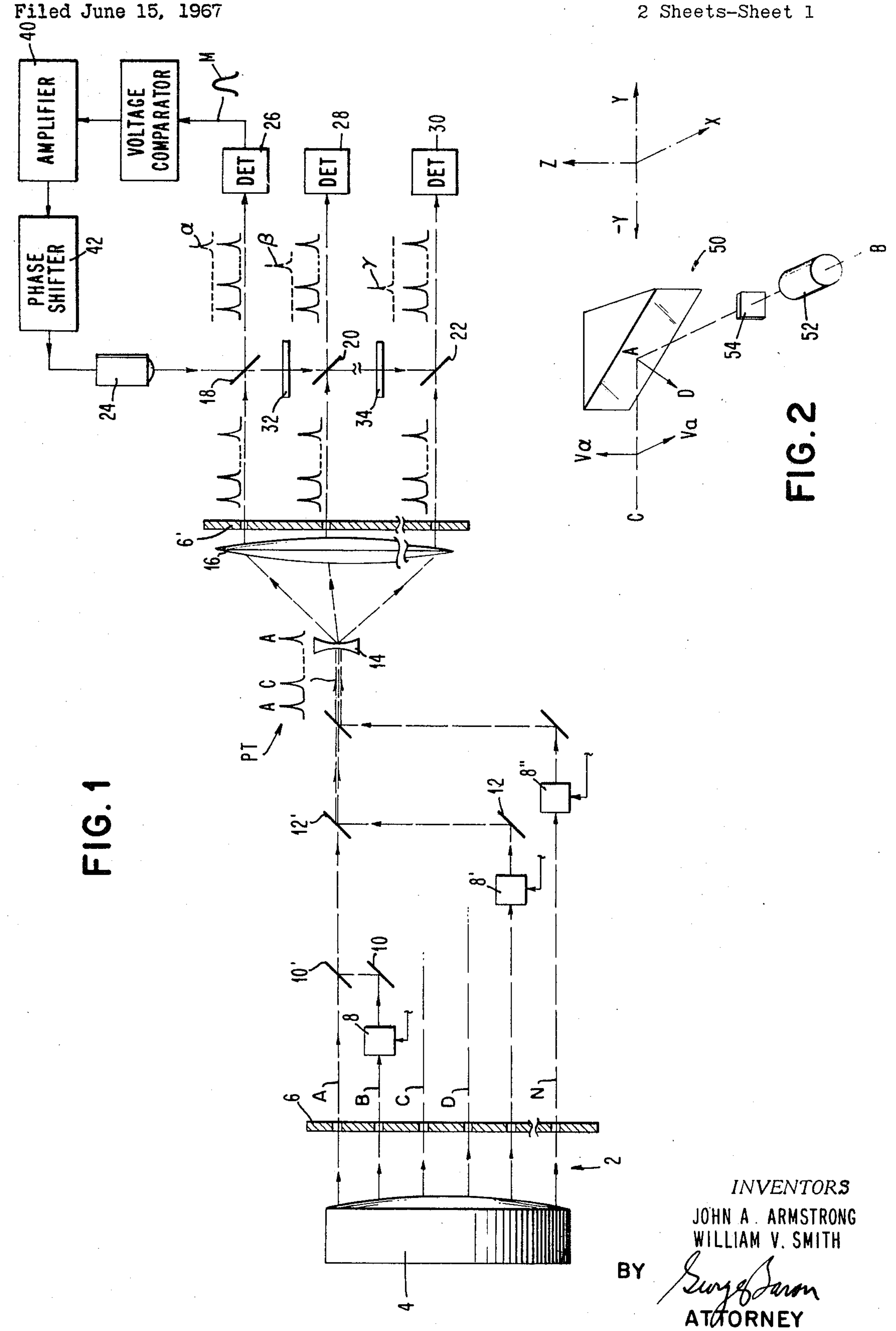
FIG. 1 is a schematic representation of the overall communication system including the apparatus for putting many channels of information on a single carrier pulse and the detector means for sorting out the information being carried by the many channels.
FIG. 2 is a showing of a representative detector employed with the communication system of the present invention.
Figure 5:
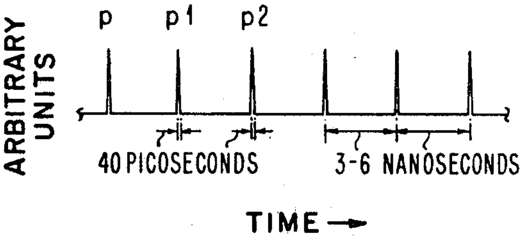
FIG. 5 is an example of the train of pulses produced by a mode locked laser.

As seen in FIG. 1, input beam 2 represents the output of a mode locked laser 4 and will comprise a train of pulses *p*, *p*1, *p*2, etc. (see FIG. 5) that are about 3 to 10 nanoseconds apart and each pulse having a width of the order of 40 picoseconds. Such train of pulses impinges upon apertured plate 6 and, assuming N apertures in plate 6, there will be A, B, C . . . N individual trains of identical pulses. In the path of each such individual laser train, but for the first train, is a shutter or modulator 8, 8′, 8″, etc. Representative, but not all inclusive type shutters or modulators, would be a Kerr cell or a Pockels cell wherein either the linear quadratic optic effect or the linear electro-optic effect is used to prevent the passage of light along a given channel. Such a shutter or modulator is normally closed to the passage of light but is responsive to a voltage pulse to cause rotation of the plane of polarization of such light and allow its transmission.

Associated with each channel, B, C, D . . . N, is a pair of parallel mirrors, 10, 10′, 12, 12′, etc. The upper mirror 10′ (or 12′) serves as a beam splitter. Each of such pairs, namely, that which is associated with its corresponding shutter 8, 8′, etc., is disposed at 45° to the transmitted light and transmits the latter to its companion beam splitter which then transmits the light along the single beam A. It is understood that each beam splitter 10′, 12′, etc. in beam A is half-silvered so that the light pulses on beam A are transmitted through all the beam splitters, 10′, 12′, etc., that lie in its path. For example, mirrors 10′, 12′, etc., can be constructed to transmit about 85% of the light impinging upon it but reflect only 15% of such impinging light. As is readily seen, the multiplexer serves to transmit a plurality of N pulses along a single spatial beam A, each of such pulses having a fixed delay $\tau_b$, $\tau_c$, $\tau_d$, . . . $\tau_n$ with respect to the original pulse on beam A.

The multiplexed input of binary information on beam A in the form of interleaved pulses is received at a conventional beam spreader comprising a divergent lens 14 and convergent lens 16. Any other technique or device can be used to widen beam A; the one shown is merely typical of one of many capable of use with the invention. The broadened beam passes through another apertured plate 6′ to produce N trains of pulses, each train carrying the identical information carried on beam A.

Assume, solely for purposes of explaining the invention, that only three trains of pulses were created by apertured plate 6 and only the shutter (not shown) for the C channel was actuated to allow for the transmission of a light pulse, but shutter 8 of channel B was not actuated. Consequently, the interleaved information presented to lens 14 would comprise the optical pulse train PT representing information on channel A, i.e., transmission of a "1"; no pulse on channel B, i.e., transmission of a "0"; and a pulse on channel C, and the A pulse to the left of the C pulse starting a new data set. It is seen that the delay between the pulses A, B, C is introduced by the different optical paths each light pulse on a given channel must take. The delay is determined by the distance between mirrors 10–10′, 12–12′, etc.

In order to be able to monitor the spatial relationships between the information-carrying pulses in the pulse train PT, a second mode locked laser 24 serves as a local oscillator for providing clock pulses. Such clock pulses must, like the information-bearing pulses, be delayed in time with a fixed delay time equal to that introduced by pairs of mirrors 10–10′, 12–12′, etc. Such delay in the clock pulses is achieved by the different path lengths the light pulse from laser source 24 takes in traversing beam splitters 18, 20 . . . 22. Consequently, clock pulse $\alpha$ appears ahead of clock pulse $\beta$ by the same distance that the pulse A on channel A precedes pulse B on channel B, etc. The multiplexed train PT of pulses is polarized orthogonally to the clock pulses $\alpha$, $\beta$, . . . $\gamma$. This orthogonal polarization is required for the type of detectors 26, 28 and 30 that are employed in the preferred embodiment of this invention. Each detector 26, 28, . . . 30 is capable of detecting, in a manner to be described more fully hereinafter, only the coincidence of a pulse A in the transmitted train PT and its corresponding clock pulse $\alpha$, the coincidence of pulse B and clock pulse $\beta$, etc. If there is no coincidence of such orthogonally polarized pulses, i.e., no data bit being transmitted when a clock pulse exists, the associated detector does not sense any information.

Since each detector 26, 28, 30, etc. detects coincident pulses that are polarized orthogonally to each other, it is desirable to avoid having the respective information-bearing pulse trains PT impinge on the wrong detector 26, 28, etc. Consequently, polarizers 32 and 34 are employed to transmit the laser pulses from source 24 that have the desired polarization but not transmit those information-bearing pulses which are reflected downwardly by a beam splitter 18, 20, etc. Thus, a detector such as detector 28 will receive clock pulses from laser source 24 and information-bearing pulses on channel B that has passed through beam splitter 20, but will not receive information-bearing pulses from channel A in that polarizer 32 will not pass them. As seen in FIG. 1, clock pulse $\alpha$ coincides with information-bearing pulse A in train PT and such coincidence produces a useable output signal from detector 26. Clock pulse $\beta$ does not find a corresponding information-bearing pulse B, so no indication of coincidence is produced in detector 28; clock pulse $\gamma$ finds an information-bearing pulse when it appears at the detector 30 so an indication of coincidence takes place.

Figure 3:
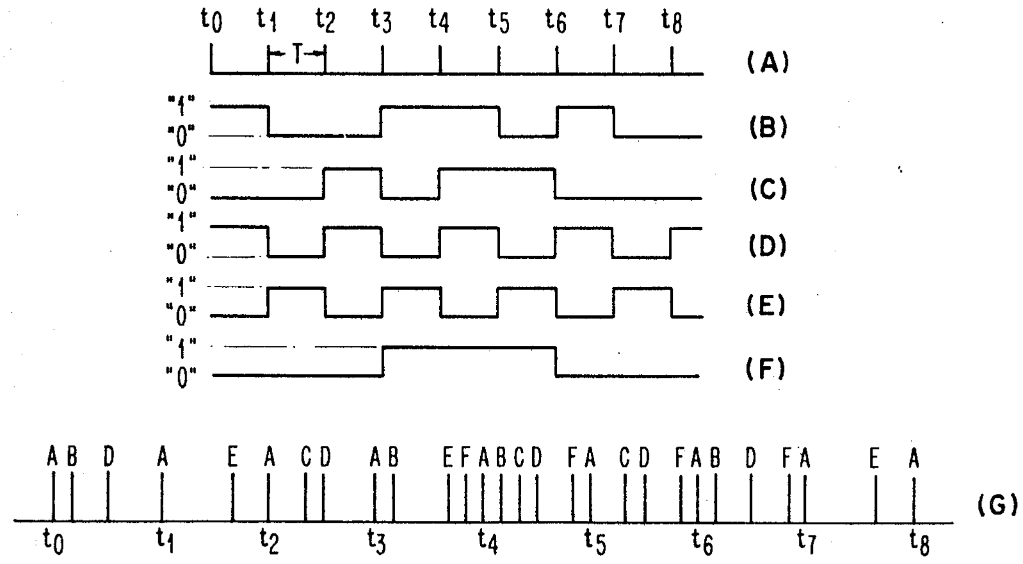
FIGS. 3A–3G are pulse-time diagrams indicating the history of pulse trains at various points in the apparatus shown in FIG. 1.

The operation of the multiplex communication system using mode locked lasers can be more readily understood by looking at FIGS. 1 and 3. Mode locked laser 1 is turned on and produces a series of pulses shown in FIG. 3A, such pulses being about 40 picoseconds wide and having a fixed period T equal to about 8 nanoseconds. Mode locked laser 24 is also turned on to produce clock pulses $\alpha$, $\beta$, $\gamma$, etc., which have the same period T. No transmission of information is begun until the output reading from a voltage comparator 38 is zero, indicating that the clock pulses $\alpha$, $\beta$, $\gamma$, etc. are being transmitted at the same repetition frequency as those of mode locked laser 4, and clock pulse $\alpha$ and laser pulse A are arriving simultaneously at detector 26.

During each pulse repetition period of the mode locked laser 4, certain shutters 8, 8′, are simultaneously actuated. If a "1" signal is to be transmitted, for example, in channel B, appropriate voltage is applied to shutter 8 to permit a laser pulse to be transmitted to mirror 10. If a "0" signal is to be transmitted on a given channel, then the corresponding shutter for such channel is not actuated. Thus, if binary data is to be transmitted on the single beam A that extends beyond the last beam splitter on such channel, it is seen in FIGS. 3A–3G that channels B and D are emitting pulses between two adjacent laser pulses A—A at the interval at $t_0$–$t_1$. For the interval $t_1$ to $t_2$, only channel E is transmitting a pulse, whereas channels B, C, D and F are transmitting pulses during interval $t_4$–$t_5$. A laser pulse on channel A always provides the start of a fresh data set being multiplexed.

The interleaved channels shown in FIG. 3G contain pulses of standard height and width. At the detecting station, the multiplexed beam A is separated by apertured plate 6′ into as many channels as exist in the transmitting portion of the multiplexer. Mode locked laser 24 serves as a local oscillator and provides N trains of clock pulses $\alpha$, $\beta$, $\gamma$, . . . separated by time T. These clock pulses have the same widths as all the transmitted laser pulses. A separate one of the these N trains of clock pulses is combined with each of the N received multiplexed trains. Clock pulses $\alpha$, $\beta$, $\gamma$, etc., are polarized orthogonally to beams A, B, C, etc. Pulse $\alpha$ is combined with pulse A, clock pulse $\beta$ with pulse B, clock pulse $\gamma$ with pulse C, etc., such combination being possible because each of the successive pulses B, C, D, E, . . . etc., on the single beam A has a fixed delay imparted to it with respect to reference pulse A by the location of mirrors 10, 10', 12, 12' and each clock pulse has a corresponding delay imparted to it because of the location of beam splitters 18, 20, etc.; thus $\beta$ is delayed with respect to $\alpha$ by the same amount as B with respect to A; $\gamma$ is delayed with respect to $\beta$, etc. the same amount that C is delayed with respect to B, etc.

Each detector 26, 28, etc., as seen in FIG. 2, consists of a plane polished crystal 50 of GaAs whose normal $\overrightarrow{AD}$ to the polished plane of the crystal is at 45° to the direction of the incident beam $\overrightarrow{CA}$. In FIG. 1, one clock pulse $\alpha$ is superimposed on information pulse A, but the polarization vector $V\alpha$ of pulse $\alpha$ is perpendicular to the polarization vector $Va$ of pulse A. The [001] axis of the GaAs crystal 50 is parallel to the polarization vector $V\alpha$. Sum frequency light is produced along line $\overrightarrow{AB}$, such sum-frequency light being polarized parallel to the plane of incidence of pulse A and clock pulse $\alpha$. A light detector, such as photomultiplier 52, lies in the path of sum-frequency light $\overrightarrow{AB}$. The photomultiplier 52 includes a polarizer so as to make such photomultiplier sensitive only to harmonic light polarized parallel to the plane of incidence. If desired, a filter 54, highly transmissive only of the sum-frequency light generated at the polished plane of crystal 50, is used to improve the discrimination of photomultiplier 52. The single crystal of GaAs produces a sum-frequency signal of the incident pulses on line $\overrightarrow{CA}$ along line $\overrightarrow{AB}$ only when a clock pulse overlaps in time and space a pulse in the multiplexed train, and such two pulses are disposed orthogonally of each other. The detecting GaAs crystal is highly sensitive to coincident arrival of two pulses and the ratio of harmonic signal generated at coincidence compared to harmonic signal at non-coincidence is about 100:1. A more detailed teaching of the coincidence detector employed to illustrate the invention is found in an application filed on May 4, 1967, for "An Ultrafast Optical Coincidence Detector" by John A. Armstrong, Ser. No. 636,105, now U.S. Pat. 3,445,668, and in an article entitled "Measurement of Picosecond Laser Pulse Widths," John A. Armstrong in vol. 10, No. 1, pp. 16–18 of the Jan. 1, 1967 issue of "Applied Physics Letters."

In the overall system shown and described hereinabove, the type of coincidence detector need not be a GaAs single crystal detector. Any fast detector of coincident narrow width pulses will do, but the specific one chosen to illustrate the invention is known to be an ultrafast detector of coincident optical pulses.

Figure 4:
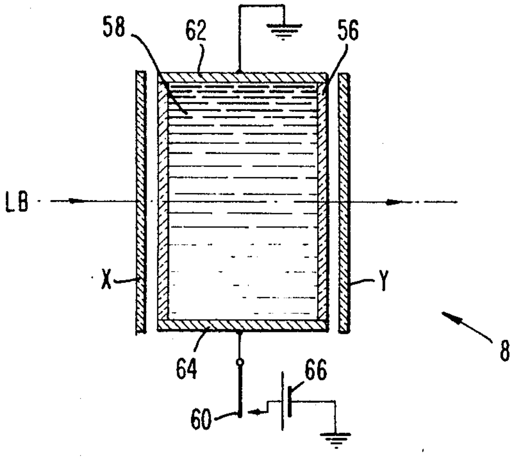
FIG. 4 is a showing of a representative light modulator 8, 8′, 8″, etc. shown in FIG. 1.

FIG. 4 shows a representative Kerr cell that can be used as a light shutter 8, 8', etc. in the multiplexer portion of the communication system. A glass cell 56 is placed between crossed polarizers X and Y and contains a suitable dielectric fluid 58, for example, nitrobenzene. With switch 60 opened, any laser pulse entering cell 56 from the left will not be transmitted beyond polarizer Y. When the switch 60 is closed, the electric potential applied to plates 62 and 64 from battery source 66 will rotate the plane of polarization of the entering laser pulse by 90°. Polarizer plates X and Y placed before and after cell 56 are crossed so that in the absence of an applied voltage to plates 62 and 64, i.e., switch 50 is opened, no light beam LB is transmitted through polarizer Y. However, when switch 60 is closed (representing a binary "1" or other data), the potential applied to plates 62 and 64 causes the nitrobenzene to rotate the plane of polarization of the laser pulse entering the cell 56 so that polarizer Y now transmits the laser pulse on light beam LB.

In the process of transmitting many channels of information on a single beam of identical pulses, the clock pulses $\alpha$, $\beta$, $\gamma$, etc. must be synchronized with the information pulses being transmitted on channels A, B, C. . . . To accomplish this synchronization, the output of detector 26 is fed to a voltage comparator 38 whose output signal is amplified by amplifier 40 before being transmitted to phase shifter 42. The output signal of the latter is applied to the unit that modulates the internal loss of laser 24 at a frequency equal to the separation between adjacent oscillating longitudinal modes in such laser so as to achieve phase locking.

Since the detector 26 is a coincidence detector, its output amplitude M is proportional to the amount of overlap of information-bearing pulse A and clock pulse $\alpha$. Prior to transmitting on the multiplexer unit of this invention, coincidence of A pulses and clock pulses $\alpha$ is sensed by detector 26 and if the amplitude of signal M is below a predetermined maximum, a voltage difference signal is sent through amplifier 38 to phase shifter 42 so as to vary the time of occurrence of pulses from mode locked laser 24. When the amplitude signal M is a maximum, there is no voltage difference signal sent back to the loss modulator of laser 24 and the transmitting laser 4 and clock pulse generating laser 24 are in synchronism and transmission can commence. Obviously other modes of synchronizing the two mode locked lasers can be used without departing from the spirit of the invention.

In the pulse data transmission system described above, maximum data rate is equal to the reciprocal of the width of an individual mode locked laser pulse. Such individual pulse width can be made as short as $10^{-11}$ sec. or shorter, permitting binary data transmission rates of $10^{11}$ bits/sec. This high speed transmission can be accomplished without the need for optical shutters that must operate at similar speeds of $10^{-11}$ sec.

The bandwidth requirements of the shutters is less than the overall bandwidth of the system by a factor equal to the number of data channels multiplexed together. Thus, if 200 channels of binary information are multiplexed together with a resultant transmission rate of $10^{11}$ bits/sec., the individual shutter need only have a speed equivalent to $10^{11}/200$, or $5\times10^8$ bits/sec., the latter speed being consistent with present state-of-the-art electro-optical shutters. Obviously the invention can accommodate even faster shutters if and when they are available.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A communication system comprising a source of a repetitive first train of identical optical pulses,
   - means for separating such train of pulses into a plurality of identical trains,
   - shutter means interposed in the path of each such identical train,
   - means capable of actuating each shutter so as to provide for the transmission of selected pulses in each particular train of pulses in the form of a pulse-no pulse binary transmission,
   - optical delay means introduced in each path whereby each train path has a different and characteristic length than any other train path,
   - means for combining said plural delayed optical pulse trains into a single beam containing a data set of binary information in the form of interleaved optical pulses, means for producing a plurality of second trains of optical pulses from said single beam, each such second train carrying the identical information as said combined single beam,
   - clock means for transmitting a third train of optical pulses having the same widths as the pulse widths in said first train and the same delay introduced between pulses as is introduced in the binary information-bearing optical pulses, means for synchronizing the first optical pulse of each of said second trains with the first optical pulse of said third train of pulses, and means for detecting the coincidence of each delayed information-bearing pulse with a clock pulse having a corresponding delay in its train of optical pulses.

2. A communication system comprising a first source of a repetitive train of identical optical pulses of a first polarization, means for separating such train of polarized pulses into a plurality of identical trains, shutter means in the path of each such identical train for providing for the passage of optical pulses in response to actuating signals applied to said shutter means, whereby binary information-bearing pulses in the form of pulse-no pulse transmission are produced in each train, optical delay means introduced in each path whereby each train path has a different and characteristic length than any other train path, means for combining said plural delayed optical pulse trains into a single beam containing a data set of binary information in the form of interleaved pulses, means for producing a plurality of second trains of optical pulses, each such second train carrying the identical information as said combined single beam, clock means for transmitting a third train of optical pulses having the same widths as the pulse widths in said first train and the same delay introduced between pulses as is introduced in the binary information-bearing optical pulses, said third train of optical pulses being orthogonally polarized to the polarization of said information-bearing pulses, means for synchronizing the first optical pulse of each of said second trains with the first optical pulse of said third train of optical pulses, means for sampling each delayed information-bearing pulse with a clock pulse having a corresponding delay in its train of optical pulses, and means for detecting the coincidence of an information-bearing polarized pulse with its corresponding orthogonally polarized clock pulse.

3. The communication system of claim 2 wherein the detecting means for said orthogonally polarized pulses is a single crystal of gallium arsenide capable of producing a sum-frequency of the two coincident pulses impinging upon it.

4. The communication system of claim 2 wherein the generator of the information-bearing pulses and the generator of the clock pulses are mode locked lasers.

5. An optical communication system comprising a source of a first train of identical repetitive, narrow optical pulses produced by a mode-locked laser and each pulse in the train having a first polarization, means for separating such train of first polarized pulses into a plurality of identical trains, shutter means interposed in the path of each such identical train, means capable of actuating each shutter so as to provide for the transmission of selected pulses in each particular train of pulses in the form of a pulse-no pulse binary transmission, optical delay means introduced in each path whereby each train path has a different and characteristic length than any other train path, means for combining said plural delayed optical pulse trains into a single beam containing a data set of binary information in the form of interleaved optical pulses, means for producing a plurality of second trains of optical pulses, each such second train carrying the identical information as said combined single beam, clock means including a second mode-locked laser for transmitting a third train of optical pulses having the same widths as the widths of pulses in said first train and the same delay introduced between pulses as is introduced in the binary information-bearing optical pulses but whose polarizations are orthogonal to the polarizations of the pulses in said first train, means for synchronizing the first optical pulse of each of said second trains with the first optical pulse of said third train of pulses, and means for sampling each delayed information-bearing pulse with a clock pulse having a corresponding delay in its train of optical pulses, and means for sensing the simultaneous presence of the two orthogonally polarized pulses.

References Cited

UNITED STATES PATENTS

| | | | |
|---|---|---|---|
| 2,454,792 | 11/1948 | Greig | 179—15 |
| 3,256,443 | 6/1966 | Moore | 250—199 |
| 3,229,095 | 1/1966 | Lasher et al. | 329—144 X |
| 3,430,048 | 2/1969 | Rubinstein | 250—199 |
| 3,435,226 | 3/1969 | Rack | 250—199 |

ROBERT L. GRIFFIN, Primary Examiner

B. V. SAFOUREK, Assistant Examiner

U.S. Cl. X.R.

179—15; 332—7.51; 343—203